(No Model.)

A. DI MARIANO.
BRACELET.

No. 267,164. Patented Nov. 7 1882.

WITNESSES:
C. Neveux
C. Sedgwick

INVENTOR:
A. Di Mariano
BY Munn & Co
ATTORNEYS.

UNITED STATES PATENT OFFICE.

ANTONIO DI MARIANO, OF NEW YORK, N. Y.

BRACELET.

SPECIFICATION forming part of Letters Patent No. 267,164, dated November 7, 1882.

Application filed May 9, 1882. (No model.)

*To all whom it may concern:*

Be it known that I, ANTONIO DI MARIANO, of the city, county, and State of New York, have invented certain new and useful Improvements in Bracelets, of which the following is a full, clear, and exact description.

Reference is to be had to the accompanying drawings, forming part of this specification, in which similar letters of reference indicate corresponding parts in all the figures.

Figure 1:
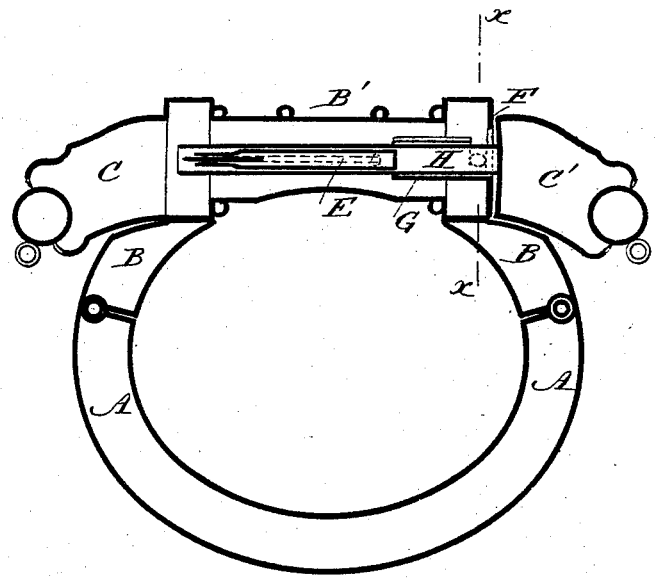
Figure 2:
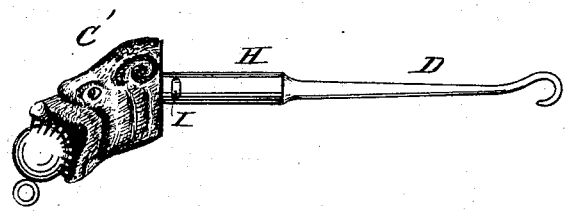
Figure 3:

Figure 1 is a sectional plan view of my improvement. Fig. 2 is a side elevation of a part of the same. Fig. 3 is a sectional elevation of a part of the same, taken through the line $x\,x$, Fig. 1.

The object of this invention is to provide bracelets constructed in such a manner as to serve as a receptacle for a glove-button hook, a pencil, or other implement.

The invention consists in a bracelet constructed with a hollow straight part having an ornament attached to one end, and at its other end a plate and tube slotted to receive the shank and locking-toe of an implement attached to an ornament corresponding with the ornament attached to its first end, as will be hereinafter fully described.

The body of the bracelet is made in two parts, A B, which are hinged to each other at one end, and are connected at the other end by a catch made to resemble a hinge, so as to make the two joints correspond in appearance. The middle portion, B', of the upper part, B, is made straight and hollow, to adapt it to serve as a receptacle for a glove-button hook, a pencil, or other implement. To one end of the straight part B' is attached an ornament, C, which in the drawings is represented as the head of an animal holding in its mouth a ball. A similar ornament, C', is placed at the other end of the straight portion B' of the bracelet. To the ornament C' is attached a glove-button hook, D, a pencil, E, or other desired implement; or a glove-button hook, D, can be attached to the ornament C' of one of a pair of bracelets and a pencil, E, to the ornament C' of the other bracelet of the said pair. The end of the straight part B' of the bracelet is closed by a plate, F, in the center of which is formed an aperture, through which the implement attached to the ornament C' is inserted. To the inner side of the plate F is attached the end of a short tube, G, to serve as a support to keep the implement in a horizontal position. To the shank H of the implement, at a little distance from the ornament C', is attached, or upon it is formed, a projection or toe, I, which passes through a slot in the plate F and tube G, so that the ornament C' and the implement attached to it can be secured in place by turning the ornament C' through a part of a revolution, so as to bring the toe I into such a position as to rest against the inner side of the plate F, and thus lock the ornament and implement in place. Upon the outer ends of the ornaments C C' are formed eyes to receive the end of a chain, (which is not shown in the drawings,) to prevent the ornament C' from being lost should it become accidentally detached, and which also serves as an ornamental attachment to the bracelet.

With this construction the wearer of the bracelets will always have with her and in a position conveniently accessible a glove-button hook and a pencil ready for use when required.

Having thus fully described my invention, I claim as new and desire to secure by Letters Patent—

1. A bracelet constructed, substantially as herein shown and described, with a hollow straight part, B', having an ornament, C, attached to one end, and at its other end a plate, F, and tube G, slotted to receive the shank H and locking-toe I of an implement attached to a corresponding ornament for its other end, as set forth.

2. In a bracelet, the combination, with the hollow straight part B', having a plate, F, and tube H, provided with a slot, of an implement-shank attached to an ornament and provided with a locking-toe, substantially as herein shown and described, whereby the wearer of the bracelet will always have a convenient implement in a readily-accessible position, as set forth.

ANTONIO DI MARIANO.

Witnesses:
JAMES T. GRAHAM,
C. SEDGWICK.